United States Patent [19]

Sander et al.

[11] Patent Number: 4,739,738

[45] Date of Patent: Apr. 26, 1988

[54] CAST COMPONENTS FOR INTERNAL COMBUSTION ENGINES WITH EMBEDDED REINFORCING LAYERS

[75] Inventors: Wilfried Sander; Siegfried Mielke, both of Neckarsulm, Fed. Rep. of Germany

[73] Assignee: Kolbenschmidt Aktiengesellschaft, Neckarsulm, Fed. Rep. of Germany

[21] Appl. No.: 795,386

[22] Filed: Nov. 6, 1985

[30] Foreign Application Priority Data

Dec. 5, 1984 [DE] Fed. Rep. of Germany ....... 3444406

[51] Int. Cl.⁴ .............................................. F02B 75/02
[52] U.S. Cl. .................................. 123/193 P; 123/668
[58] Field of Search .......... 123/193 R, 193 C, 193 P, 123/193 CP, 193 CH, 193 H, 668, 669, 270

[56] References Cited

U.S. PATENT DOCUMENTS

| | | |
|---|---|---|
| 4,245,611 | 1/1981 | Mitchell et al. ................. 123/193 P |
| 4,254,621 | 3/1981 | Nagumo .............................. 123/669 |
| 4,511,612 | 4/1985 | Huther et al. ....................... 123/270 |
| 4,526,824 | 7/1985 | Dworak et al. .............. 123/193 CH |

*Primary Examiner*—Charles J. Myhre
*Assistant Examiner*—David A. Okonsky
*Attorney, Agent, or Firm*—Sprung Horn Kramer & Woods

[57] ABSTRACT

Light alloy components for internal combustion engines consist of castings in which reinforcing layers consisting of non-woven ceramic fibers are embedded in the stressed surface portions. In order to provide a prolonged protection against damage to the light alloy disposed under the reinforcing layer, the open interstices of the fibrous layer are impregnated with a layer of a ceramic material in the portion which is close to the stressed surface and with the light alloy of the component in the portion which is remote from the stressed surface.

11 Claims, 2 Drawing Sheets

CAST COMPONENTS FOR INTERNAL COMBUSTION ENGINES WITH EMBEDDED REINFORCING LAYERS

BACKGROUND OF THE INVENTION

This invention relates to cast components which define the combustion chambers of internal combustion engines, such as pistons and cylinder heads, which are preferably made of light alloys and in which those surface portions which are subjected to wear and/or to high temperatures contain an embedded reinforcing layer consisting of nonwoven ceramic fibers or of whiskers. The invention also relates to a process of joining the reinforcing elements to the components.

Owing to the considerably increase of the power per unit of weight and of the life, reliability in operation and economy of internal combustion engines, their components, particularly the components which define the combustion chamber, such as the pistons and cylinder head, must be so designed that they will withstand the stresses to be encountered. The stress of the piston is mainly caused by the mechanical loading due to the gas pressure and the thermal loading which is due to high temperatures and to stresses imposed by the temperature gradient. For a control of the high thermal loading the piston may be provided with a cooling chamber but the latter usually does not tend to reduce the thermal stresses because the temperature gradient is increased adjacent to the cooling chamber. A cooling of the piston is also inconsistent with the desire to reduce the dissipation of heat from the combustion process of the coolant and to the lubricant although that desire involves a high thermal loading of the piston head.

A piston having a piston head which defines a combustion recess will be particularly critically stressed at the rim of said recess. In that zone the heat transfer is decreased by the accelerated flow of the combustion gases but the dissipation of heat is restricted. These influences tend to increase the temperature at the rim of the recess and together with the high tangential stress which is due to the temperature distribution result in a stress above the elastic limit. A cooling which results from a load chamber or from a shutdown of the internal combustion engine will result in inherent tensile stresses. As that phenomenon occurs frequently, thermal fatigue cracks are formed at the rim of the recess and may grow to a large depth. In pistons having a cooling chamber said cracks may finally open into the cooling chamber so that the combustion gases can be blown into said chamber.

The internal combustion engine may have such a design that abnormally high temperatures are obtained in the ring zone or a fuel may be used which leaves large amounts of residues, or a large piston clearance may have been selected for special reasons so that the piston can tilt, or the air may not be adequately filtered, particularly in a dust-laden environment, e.g., on building sites. Said conditions will render the ring grooves of the piston, particularly the uppermost ring groove, susceptible to wear, which may result in a risk of a breakage of the piston rings.

A restricted relief of the load on the piston head and the rim of the recess may be achieved by an optimum design and by a decrease of the stresses which are due to the gas force and the temperature distribution.

That problem can be remedied for a short operating time in that the rim of the recess is reinforced by an embedded ring consisting of nickel-alloyed cast iron (Fachkunde Kraftfahrtechnik, 2nd edition, Holland + Josenhans Verlag, Stuttgart 1982, page 27). But after a prolonged operation the permanent deformation results in a formation of a gap between the cast iron ring and the piston head. Other disadvantages of such reinforcement at the rim of the recess reside in that it adds to the weight and to the manufacturing costs of the piston. For this reason it has been proposed to provide a ring made of aluminum titanate (Published German Application No. 32 30 388). But owing to the shrinkage joint between the ring and the surrounding piston material such ring can be used only if it can bear on a sufficiently large surface of the surrounding piston material. In the search for alternative solutions which avoid the disadvantages mentioned above it has been proposed to apply metallic and cement layers to the piston head by flame spraying and plasma spraying (Published German Application No. 31 37 731). But the deposition of such layers is disturbed at the sharp edges of the rim of the combustion recess and the layers do not adequately adhere under special loads. This is due to the high thermal loading which are encountered and which gradually soften the material and promote the formation of cracks, and to the high temperature gradient which is obtained in the coating and results in high stresses (Published German Application No. 25 07 899). From Published German Application No. 25 07 899 it is known to provide piston heads with a hard layer of anodized aluminum in a thickness of 30 to 80 microns. Whereas this results in a distinctly higher resistance to thermal fatigue, an appreciable temperature drop is not effected thereby. Another known piston (Diesel Progress North America, April 1984) is provided with a sheet steel covering to which a steel wire mesh has been sintered on the side which is remote from the stressed side. The covering is joined to the piston as it is made by pressure diecasting. That piston effects only a limited heat insulation and its weight is increased by the covering and by the steel wire mesh.

If there is a risk of wear of the ring grooves, so-called ring carrier pistons have been used in which a cast piston body consisting of an aluminum piston alloy is provided at least adjacent to the uppermost piston ring groove with an embedded ring carrier, which is made of ferrous material and is formed with a recess consisting of the ring groove and said ring carrier is joined to the piston body by means of an intermetallic bonding layer (Thecnisches Handbuch, Karl Schmidt GmbH, Neckarsulm 1967, pages 106 to 107). The ring carrier embedded in the cast piston body adds undesirably to the weight of the aluminum piston. Another reinforcement is provided in that a piston consisting of an aluminum alloy is formed with a groove in the ring zone and said groove is lined by metal spraying with a thin interlayer of molybdenum, cobalt, nickel or an alloy thereof and of stainless steel and is then filled with a stainless steel having a high chromium content and a specified nickel content, and the ring grooves are subsequently formed (Published German Application No. 14 00 115). The disadvantage of that practice resides in that the bond strength between the aluminum layer and the sprayed interlayer is low.

British Patent Specification No. 2,106,433 describes a light alloy piston which is made by pressure diecasting and in which a layer of fibers or whiskers is embedded in the piston head in order to avoid a formation of cracks. In Published European Patent Application No. 80 562 it is proposed to effect a protection against wear and/or a formation of thermal fatigue cracks in light alloy components in that non-woven ceramic fibers in a proportion of 2 to 10 vol. % are embedded in such components. But such pistons or components are not satisfactory as regards wear resistance and heat insulation.

SUMMARY OF THE INVENTION

For this reason it is an object of the present invention to provide cast components for defining the combustion chamber of internal combustion engines, such as pistons and cylinder heads, which components comprise an embedded reinforcing layer consisting of nonwoven ceramic fibers or whiskers and providing for a protection of surfaces against wear and/or for heat insulation, and to design such components so that they comprise close to their surface a relatively thin zone which ensures for a long time a prolonged protection against damage to the underlying light alloy material of the component.

That object is accomplished in that the open interstices of the fibrous or whisker structure are filled in that portion which faces the stressed surface of the component with a layer of a hardened ceramic material having a low porosity, in that portion which faces away from the stressed surface with a layer of the light alloy, and in an intermediate portion with a layer consisting of the ceramic material and the light alloy, and that the fibers or whiskers have a diameter of 0.5 to 5 μm and a ratio of diameter to length of 1:10 to 1:100, and occupy a volume of 10 to 50% of the overall volume of the reinforcing layer.

The interstices of that portion of the fibrous or whisker layer which faces away from the stressed surface of the component are entirely filled with the light metal material of the components so that the formation of a joint between the ceramic layer consisting of the hardened ceramic material and the light alloy material of the components is ensured by the fibers or whiskers. As a result, forces can be transmitted in the plane of the joint and at right angles thereto. It is assumed that in accordance with the state of the art an adequate bond strength is provided between the ceramic maxtrix and the metallic matrix, on the one hand, and the fibers or whiskers. An additional bond is obtained on the relatively large interface between the ceramic material, which is reinforced by fibers or whiskers and the light alloy material of the component, which is reinforced by fibers or whiskers. That additional bond is due to the fact that the light alloy of the component enters the open pores of the ceramic layer, which is reinforced with fibers or whiskers, to such a depth that the bond strength is not only due to atomic forces at the interfaces but is increased by the mechanical interlock which is due to the irregular shape of the pores. Owing to the fibrous or whiskers layer provided in the ceramic layer, the bond strength between the ceramic layer and the light alloy is distinctly increased when cracks have formed in the ceramic layer as a result of overstressing caused, e.g., by excessively high thermal stresses. At least because the fibers or whiskers have a higher strength than the ceramic layer, they will prevent a propagation of cracks. Even if the cracks extend through the ceramic layer there will be no risk of a separation of parts of the ceramic layer because each piece is firmly connected to the cast component by means of fibers or whiskers and by the light alloy of the component, which light alloy extends into the pores. A further advantage resides in the fact that the fibers or whiskers effect an equilization of the coefficients of linear expansion of the ceramic material and the light alloy so that the stresses which inevitably arise during operation in the zones in which the materials ar joined will result much lower stresses in the zone in which the material are joined.

The fibers or whiskers suitably occupy a volume of 10 to 30% of the overall volume of the reinforcing layer. The fibers or whiskers may be randomly arranged or may be so arranged that most of them extend parallel to the surface in that portion of the reinforcing array which faces the stressed surface.

In a preferred embodiment, the volume of fibers or whiskers relative to the volume of the reinforcing layer increases preferably continuously in the direction in which load is applied and the volume occupied by the fibers or whiskers in the region which is close to the stressed surface may exceed 50% and preferably is as large as 70%. In special cases the layer of fibers or whiskers may be free of ceramic material.

In that portion which is close to the stressed surface, the layer of fibers or whiskers is impregnated with ceramic material in a depth of 1 to 20 millimeters, preferably 3 to 5 millimeters.

On the side which faces the stressed surface the reinforcing layer may be provided with a cover layer of ceramic material.

The intermediate portion of the reinforcing layer, i.e., that portion which is provided with ceramic material and light alloy, has a thickness of almost zero to almost the thickness of the ceramic layer, preferably of 0.5 to 3 millimeters.

To ensure that the shape of the layer of fibers or whiskers will be maintained as the component of light metal is cast around said array, its fibers or whiskers are suitably sintered to each other at their points of contact or are adhered to each other at such points by means of an inorganic cement.

The ceramic layer should desirably have open pores having a small volume so that the air contained in the layer of fibers or whiskers can escape and light alloy can enter said pores at least in part as the layer is impregnated with the light alloy. This will add to the strength which is due to the positive joint. In order to impregnate the layer of fibers or whiskers with light alloy on the side which is remote from the stressed surface, the molten light alloy is cast in contact with that array under a differential pressure, e.g., by pressure diecasting, vacuum infiltration or the like, and the pressure or vacuum is maintained until the light alloy has solidified.

The invention is illustrated by way of example in the drawings wherein:

DETAILED DESCRIPTION OF THE INVENTION

Figure 1:
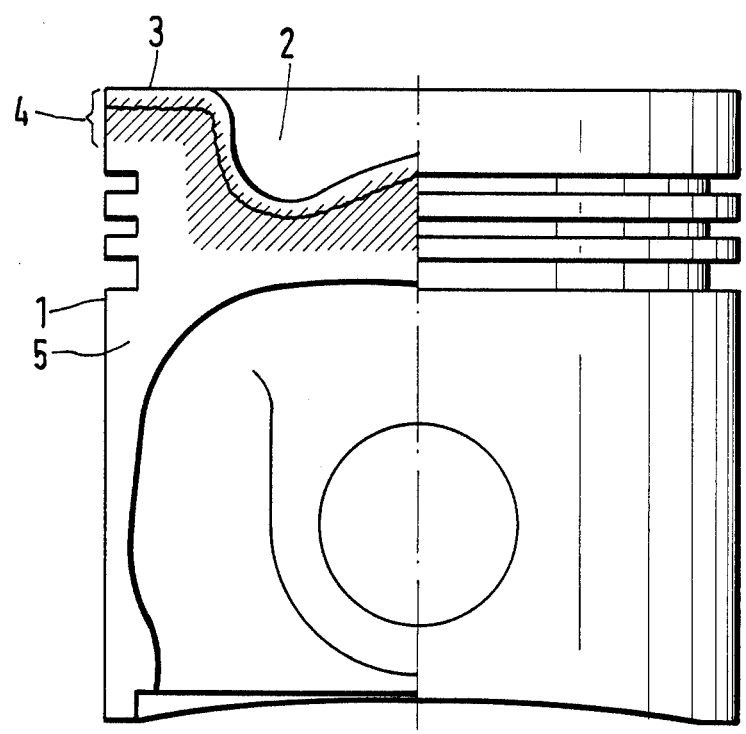
FIG. 1 is a fragmentary longitudinal sectional view of a light alloy piston for a diesel engine in accordance with the invention.

FIG. 1 is a fragmentary longitudinal section view showing a light alloy piston 1 for diesel engines. The piston has a piston head 3, which is formed with a combustion recess 2 and consists of a ceramic material that is reinforced by an embedded reinforcing layer 4 in accordance with the invention. That reinforcing layer 4 comprises a fibrous structure consisting of irregularly arranged Al$_2$O$_3$ fibers having an average diameter of 3 micrometers and a diameter-to-length ratio of 1:10 to 1:100. On the side facing the combustion chamber, the fibrous structure is impregnated with hardened SiO$_2$ to a depth of 3 to 5 millimeters. On the opposite side, the open pores of the fibrous structure are completely filled with light alloy 5.

Figure 2:
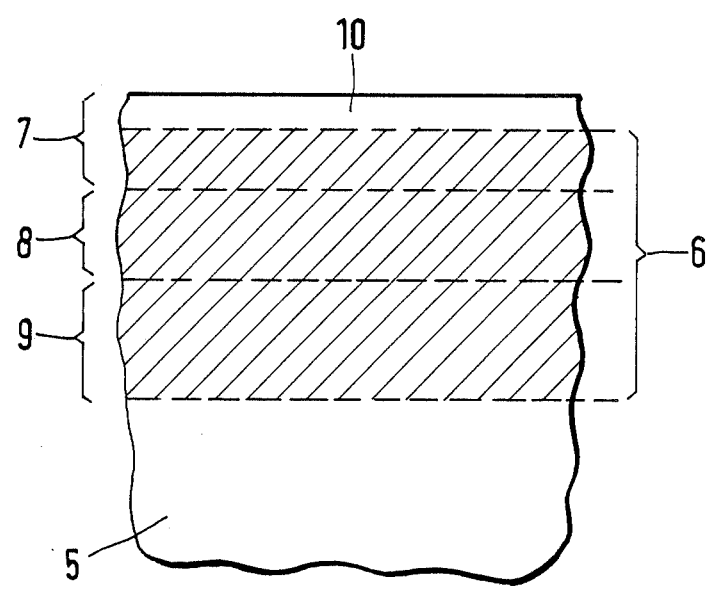
FIG. 2 shows an enlarged detail of FIG. 1.

FIG. 2 shows on a larger scale a portion of FIG. 1 to illustrate the reinforcing layer 4 which is embedded in the casting. The fibrous structure 6 is represented by a hatched area and in its portion 7 adjacent to the combustion chamber has been impregnated with a hardened ceramic material consisting of SiO$_2$. That material penetrates the fibrous structure to an irregular depth extending into the intermediate portion. In that portion 9 which is remote from the combustion chamber the pores of the fibrous structure 6 and the open pores of the ceramic layer have been impregnated with light alloy, which has been infiltrated by pressure diecasting. This structure results in an excellent mechanical interlock between the ceramic layer and the light alloy 5. On the side facing the combustion chamber, the reinforcing structure 4 is provided with a cover layer 10, which consists of the ceramic material. The intermediate portion 8 of the layer 6 is provided with ceramic material and light alloy.

It will be appreciated that the instant specification and claims are set forth by way of illustration and not limitation, and that various modifications and changes may be made without departing from the spirit and scope of the present invention.

What is claimed is:

1. A cast component for defining the combustion chambers of internal combustion engines comprising: a light alloy body, a ceramic surface of hardened ceramic material having a low porosity and which is subjected to at least one of wear and high temperatures and an embedded reinforcing layer connecting the light alloy body and the ceramic surface consisting of nonwoven ceramic fibers or whiskers, wherein open interstices of the fibrous or whisker structure are filled in that portion which faces the ceramic surface with the hardened ceramic material having a low porosity, in that portion which faces away from the ceramic surface is filled with the light alloy, and in an intermediate portion is filled with the ceramic material having a low porosity and the light alloy, and wherein the fibers or whiskers have a diameter of 0.5 to 5 um and a ratio of diameter to length of 1:10 to 1:100, and occupy a volume of 10 to 50% of the overall volume of the reinforcing layer.

2. The cast component according to claim 1, wherein the fibers or whiskers occupy a volume of 10 to 30% of the overall volume of the reinforcing layer.

3. The cast component according to claim 1, wherein the fibers or whiskers are randomly arranged.

4. The cast component according to claim 1, wherein most of the fibers or whiskers in that portion of the reinforcing layer which is near the stressed surface extend parallel to that surface.

5. The cast component according to claim 1, wherein the reinforcing layer is impregnated with ceramic material in a depth of 1 to 20 mm, in the portion which is close to the ceramic surface.

6. The cast component according to claim 5, wherein ceramic material is impregnated to a depth of 3 to 5 mm.

7. The cast component according to claim 1, wherein the volume of fibers or whiskers relative to the volume of the reinforcing layer increases continuously in the direction in which load is applied.

8. The case component according to claim 7, wherein the volume occupied by the fibers or whiskers in the region which is close to the ceramic surface is ferom 50% to 70%.

9. The case component according to claim 1, wherein the intermediate portion of the reinforcing layer has a thickness of from almost zero to almost the thickness of the ceramic portion.

10. The cast component according to claim 9, wherein the thickness of the intermediate portion is from 0.5 to 3 mm.

11. The cast component according to claim 1, wherein the fibers or whiskers are one of sintered and adhesively joined to each other at their points of contact.

* * * * *